(12) United States Patent
Dubois

(10) Patent No.: US 9,102,402 B2
(45) Date of Patent: Aug. 11, 2015

(54) LANDING GEAR, AN AIRCRAFT, AND A METHOD

(71) Applicant: AIRBUS HELICOPTERS, Marignane, Cedex (FR)

(72) Inventor: Robert Dubois, Aix en Provence (FR)

(73) Assignee: Airbus Helicopters, Marignane Cedex (FR)

( * ) Notice: Subject to any disclaimer, the term of this patent is extended or adjusted under 35 U.S.C. 154(b) by 98 days.

(21) Appl. No.: 13/654,603

(22) Filed: Oct. 18, 2012

(65) Prior Publication Data

US 2013/0105624 A1 May 2, 2013

(30) Foreign Application Priority Data

Oct. 26, 2011 (FR) ...................................... 11 03262

(51) Int. Cl.
*B64C 25/10* (2006.01)
*B64C 25/14* (2006.01)
*B64C 25/20* (2006.01)
*B64C 25/28* (2006.01)
*B64C 25/24* (2006.01)
*B64C 25/32* (2006.01)

(52) U.S. Cl.
CPC ................. *B64C 25/28* (2013.01); *B64C 25/24* (2013.01); *B64C 2025/325* (2013.01)
USPC .................................. 244/102 R; 244/102 SL

(58) Field of Classification Search
CPC ........ B64C 25/10; B64C 25/20; B64C 25/30; B64C 25/26; B64C 25/28
USPC ...................... 244/102 R, 103, 102 SL, 102 A
See application file for complete search history.

(56) References Cited

U.S. PATENT DOCUMENTS

| 3,224,713 | A | 12/1965 | Pope |
| 7,369,922 | B2 | 5/2008 | Garcia |
| 7,802,488 | B2 * | 9/2010 | Bucheton et al. ............ 74/89.23 |
| 8,109,163 | B2 * | 2/2012 | Hudson et al. ............... 74/89.25 |
| 8,191,440 | B2 * | 6/2012 | Hadley et al. ................ 74/89.39 |
| 8,272,285 | B2 | 9/2012 | Kearns |

(Continued)

FOREIGN PATENT DOCUMENTS

| CN | 1986334 A | 6/2007 |
| EP | 2082956 A2 | 7/2009 |

(Continued)

OTHER PUBLICATIONS

Search Report and Written Opinion; Application No. FR 1103262; dated Aug. 7, 2012.

(Continued)

*Primary Examiner* — Philip J Bonzell
(74) *Attorney, Agent, or Firm* — Brooks Kushman P.C.

(57) ABSTRACT

The present invention relates to landing gear (5) having at least one undercarriage (10) comprising a landing gear leg (11) carrying at least one wheel (12). The undercarriage (10) includes a retraction actuator (20) having an electric motor (23), blocking means (30) for blocking the actuator in the retraction position and for enabling the retraction actuator to be positioned in the "landing gear extended" position by gravity, first monitoring means (35) for monitoring the operation of the retraction actuator (20), first control means (65) for controlling the refraction actuator (20), and second control means (75) for controlling the blocking means (30).

19 Claims, 2 Drawing Sheets

(56) References Cited

U.S. PATENT DOCUMENTS

| | | | |
|---|---|---|---|
| 8,567,717 B2* | 10/2013 | Nannoni et al. | 244/102 R |
| 2005/0094331 A1* | 5/2005 | Gouze et al. | 361/23 |
| 2007/0144846 A1* | 6/2007 | Bucheton et al. | 188/297 |
| 2008/0072695 A1* | 3/2008 | Hudson et al. | 74/89.25 |
| 2009/0187293 A1 | 7/2009 | Trotter | |
| 2010/0332095 A1 | 12/2010 | Colin | |
| 2011/0042511 A1* | 2/2011 | Elliott et al. | 244/102 R |
| 2011/0147518 A1* | 6/2011 | Nannoni et al. | 244/102 A |

FOREIGN PATENT DOCUMENTS

| | | |
|---|---|---|
| EP | 2107273 A2 | 10/2009 |
| FR | 2887516 A1 | 12/2006 |
| FR | 2946320 A1 | 12/2010 |

OTHER PUBLICATIONS

CN201210414814.0 Examination Report dated Aug. 20, 2014; 19 pages.

* cited by examiner

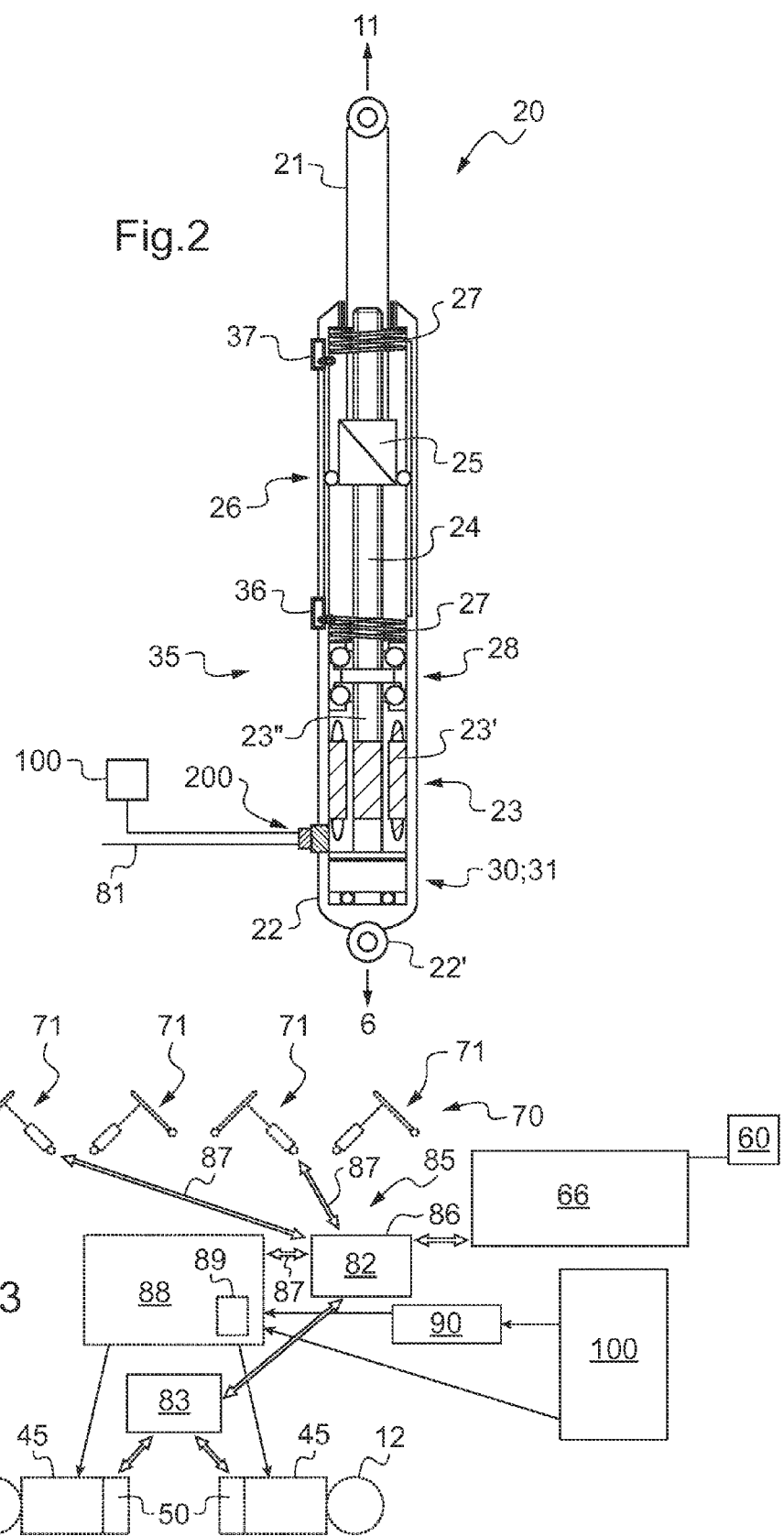

LANDING GEAR, AN AIRCRAFT, AND A METHOD

CROSS REFERENCE TO RELATED APPLICATIONS

This application claims priority to French patent application FR 11/03262 filed on Oct. 26, 2011, the disclosure of which is incorporated in its entirety by reference herein.

BACKGROUND OF THE INVENTION (1) Field of the Invention

The present invention relates to landing gear, to an aircraft having such landing gear, and to a method implemented by the landing gear.

The invention thus lies in the technical field of landing gear, and more particularly landing gear for aircraft capable of landing vertically, and in particular rotary wing aircraft. The problems associated with airplanes that are unsuitable for landing vertically are different from those associated with aircraft that are capable of landing vertically. Under such circumstances, the term "running landing" is used to designate landing as performed by an airplane, as contrasted to "vertical landing" as can be performed by aircraft capable of landing vertically, such as helicopters.

(2) Description of Related Art

Independently of the nature of the aircraft, landing gear may comprise a plurality of undercarriages, each provided with at least one wheel in order to enable the aircraft to travel on the ground until it takes off, enabling the impact that results from a landing to be damped, and including a braking system for enabling the aircraft to be brought to rest over an acceptable distance.

The increasing weight and speed of aircraft, with the corresponding increase in vertical and horizontal levels of kinetic energy that need to be absorbed during a landing, have sometimes led to oleopneumatic shock absorbers being progressively adopted. Furthermore, braking systems are sometimes provided with hydraulic controls.

In addition, the increase in aerodynamic drag caused by landing gear in flight has led to an increasing interest in landing gear that can be retracted in flight into the fuselage of the aircraft. It can be understood that, for reasons of safety, it is appropriate to guarantee that such retractable landing gear is properly extended from its housing prior to landing.

To achieve that object, various systems provide for redundancy in the control of landing gear extension in order to mitigate malfunction of any one control.

In this context, manufacturers have devised hydraulic architectures that are simple and safe for enabling landing gear to be extended rapidly. Such an architecture has one hydraulic actuator per undercarriage, which actuator is connected by pipework to a fluid tank and to a hydraulic pump.

Conventionally, the fluid tank of a helicopter is located in the top portion of the aircraft, whereas on the contrary the landing gear is situated in the bottom portion of the aircraft. Pipework thus passes from one end of the helicopter to the other, where such a configuration maximizes the risk of leakage, the weight of the device, and complicates managing co-existence between the various hydraulic and/or electrical networks.

In addition, that architecture requires numerous sensors to be used in order to verify that the various members involved are operating properly.

In order to achieve the safety targets required by certification regulations, the retraction actuators are generally linear hydraulic actuators. Hydraulic directional control valves are connected by pipework to the linear hydraulic retraction actuators in order to request retraction or extension of the undercarriage as a function of an input order, which input order may be given mechanically or electrically.

Hydraulic retraction actuators are commonly used insofar as they provide good power per unit weight. Furthermore, such linear hydraulic retraction actuators are relatively insensitive to the seizing phenomenon, and this characteristic gives an acceptable level of safety. In particular, the risk of being faced with a linear hydraulic retraction actuator that opposes an emergency extension of an undercarriage under the effect of its own weight is practically zero.

Likewise, it is common practice to use a braking system acting via a hydraulic directional control valve that is controlled by pedals, either via a mechanical link or via a positive displacement hydraulic transmission. This leads to a problem of installing hydraulic pipework from the hydraulic generator circuit to the cockpit, and then to the location for controlling the brakes.

If braking is regulated by making use of a servo-valve that servo-controls hydraulic pressure to an electrical signal, it would appear to be much simpler to feed the servo-valve directly from the hydraulic generator circuit, and to control the pressure it delivers by a signal delivered by an electrical transmitter actuated by the pedals.

Under such circumstances, the state of the art presents undercarriages, each having a shock absorber, a hydraulic retraction actuator for retracting and extending the undercarriage into and from a wheel bay, and a hydraulic braking system.

That mainly hydraulic architecture presents the advantage of being reliable and effective. Nevertheless, it requires a large amount of pipework, pumps, fluid tanks, and numerous sensors all to be used.

In addition, for an aircraft of small size such as a helicopter, it is not unusual for pipework to be installed that goes from one end of the aircraft to the other.

It can thus be understood that such hydraulic architecture is relatively heavy and bulky. Furthermore, it can be very difficult to maintain the hydraulic architecture, e.g. in order to find a leak when the sources of a leak can in fact be numerous.

Architectures are known for heavy aircraft that make use of electrical control means for controlling hydraulic retraction actuators.

Nevertheless, in order to comply with safety requirements, provision may be made to duplicate or even to quadruplicate the control means used. The person skilled in the art then refers to "duplex" or "quadruplex" architectures.

Such an architecture has little impact on airplanes of large size in terms of weight. Nevertheless, the impact in terms of weight is unacceptable on an aircraft capable of landing vertically and presenting light or medium weight.

It should be observed that there are considerable differences between airplanes and helicopters, or more generally aircraft capable of landing vertically, and as a result the technical fields of airplanes that perform a running landing and of aircraft that land vertically are distinct.

An airplane that performs a running landing, such as an airliner, presents weight that is very great compared with a small- or medium-sized aircraft capable of landing vertically. Furthermore, an airplane that performs a running landing thus presents a forward speed on landing that is much greater than does an aircraft landing vertically.

These major differences have led to helicopter manufacturers to adapt undercarriages to their own needs that are different from those of airplane manufacturers, both in terms of structure and in terms of control. Given the major role played by hydraulics in the field of flight controls, and the mastery that has been achieved in this field, such control means, which are intrinsically available, and above all which are reliable, have been the preferred means for controlling undercarriages and brakes on aircraft that land vertically.

In the state of the art, reference may be made to document FR 2 887 516.

That document presents a communications network to which actuators are connected for maneuvering, steering, and braking Document FR 2 946 320 describes a braking system for aircraft that has an electromechanical actuator acting on a pusher, the pusher applying a braking force against a disk.

Document US 2009/0187293 describes an architecture having a control module connected to sensors for sensing the proximity of an undercarriage and to a lever for verifying said undercarriage.

Document EP 2 107 273 describes landing gear provided with a landing gear leg carrying two wheels.

In addition, the landing gear has a primary actuator enabling the landing gear leg to be moved from a "landing gear retracted" position to a "landing gear extended" position, and vice versa.

Furthermore, the landing gear is provided with a hinged stay device and with a scissors linkage referred to as a "strut arrangement" that co-operates with a spring. That device enables the landing gear to be blocked in the "landing gear extended" position.

The landing gear has a second actuator for folding the scissors linkage in order to retract the landing gear leg by using the first actuator.

Document U.S. Pat. No. 3,224,713 is also known.

BRIEF SUMMARY OF THE INVENTION

An object of the present invention is thus to provide landing gear for an aircraft capable of landing vertically, the landing gear being relatively light in weight, simple, and suitable for complying with the safety objectives set by the certification regulations in force.

The term "rotary wing aircraft" is used to mean an aircraft that is capable of landing vertically even though it need not do so exclusively.

According to the invention, landing gear for an aircraft and in particular an aircraft suitable for landing vertically comprises at least one undercarriage, the undercarriage comprising a landing gear leg carrying at least one wheel.

The landing gear is remarkable in particular in that the undercarriage comprises:

a refraction actuator connected to the landing gear leg, the retraction actuator being provided with an electric motor for moving movable means of the retraction actuator relative to stationary means of the retraction actuator from a "landing gear retracted" position to a "landing gear extended" position, and from the "landing gear extended" position to the "landing gear retracted" position respectively for the purposes of extending the wheel from a wheel bay and for retracting said wheel into the wheel bay;

blocking means electrical or mechanical for blocking the position of the movable means relative to the stationary means and for enabling the movable means to be positioned in the "landing gear extended" position by gravity;

first monitoring means for monitoring the operation of the retraction actuator, the first monitoring means being connected to display means indicating the position of the retraction actuator and the state of the blocking means; and first control means for controlling the retraction actuator, and second control means for controlling the blocking means.

Under such circumstances, "electric" landing gear is obtained that is simple, compact, and light in weight.

It is observed that these characteristics make it possible to obtain an electrical architecture that is simplex and usable for an aircraft capable of landing vertically.

Under such circumstances, the first control means may be connected to the retraction actuator by a single first control line, and/or the second control means may be connected to the blocking means by a single second control line.

Consequently, the architecture used is indeed a so-called "simplex" electrical architecture. The landing gear then makes it possible to eliminate the drawbacks of hydraulic architectures.

The refraction actuator has an electric motor capable of extending or retracting the refraction actuator in order to move the landing gear leg and consequently each of the wheels of the undercarriage.

The use of such a reversible electric retraction actuator taken in isolation would appear to be incompatible with the high level of safety requirements that are in force in aviation.

Similarly, blocking means taken in isolation appear to be incompatible with a high level of safety requirements.

However the retraction actuator and the blocking means are associated with first monitoring means.

If a pilot observes prior to landing and as a result of the first monitoring means that the refraction actuator is not operating properly, the pilot can operate the blocking means so that the undercarriage moves out from its wheel well by gravity.

The combination of a retraction actuator, blocking means, and first safety means thus makes it possible to satisfy the safety requirements that are imposed without requiring an architecture that is duplex or quadruplex.

Use of the landing gear may also be associated with emergency procedures for vertical landing in the event of an incident, of the type known to the person skilled in the art.

The landing gear may also include one or more of the following additional characteristics.

For example, the landing gear is also provided with:

single brake means including an electric actuator for braking each wheel;

second monitoring means for detecting malfunction of the brake means and for informing a pilot, said second monitoring means being connected to a display member for signaling a malfunction; and third control means for controlling the brake means.

The third control means may be connected to the braking means via a single third control line.

The braking means may then comprise a disk and a brake pad co-operating with the disk, the actuator moving a plunger that presses the brake pad against the disk in order to brake the wheel.

The electric actuator can adjust the position of the plunger accurately in order to adjust the pressure the pad applies against the disk in order to determine the amount of braking It should be observed that an electric fail-safe blocking member ("organe de blocage par manque de courant électrique" in French language) can block the plunger of the actuator in a current position, e.g. in a position of maximum braking when the aircraft is on the ground.

In addition, a malfunction of the braking means before landing is detected by the second monitoring system and then a pilot is informed.

For example, the second monitoring system may comprise a pressure sensor. By matching the position of the plunger with the measured pressure, it is possible to determine a malfunction of the braking means and to inform a pilot.

The pilot aware of the malfunction can apply a strictly vertical landing procedure in order to avoid any need to apply the faulty braking means.

Consequently, the landing gear can satisfy safety requirements while using a simplex electrical architecture.

In another aspect, the blocking means include a fail-safe brake, the brake blocking the movable means of the retraction actuator in the absence of electricity.

In a variant, it is possible to provide mechanical blocking means.

Thus, under normal conditions, the fail-safe brake is not electrically powered by the second control means, thereby blocking the movable means of the retraction actuator, and thus the undercarriage.

In contrast, when the second control means are operated to start extending the undercarriage, the second control means power the blocking means. Under the action of its own weight, the undercarriage then moves out from the wheel bay.

Once extended, the fail-safe brake is no longer powered electrically and therefore blocks the undercarriage in the "landing gear extended" position.

Such blocking means are therefore simple and very safe.

In another aspect, the retraction actuator may be an actuator with a moving cylinder. Under such circumstances, the retraction actuator has stationary means of the actuator rod type fastened to the wall of the wheel bay and movable means of the actuator cylinder type fastened to the landing gear leg.

In a preferred variant, the refraction actuator is a moving-rod actuator. Under such circumstances, the retraction actuator has stationary means of the actuator cylinder type fastened to a wall of the wheel bay and movable means of the actuator rod type fastened to the landing gear leg.

The electric motor may comprise a stator and a rotor, the rotor being secured to a screw and co-operating with the blocking means. The movable means include an actuator rod comprising a nut arranged on the screw, the landing gear including anti-rotation means for preventing the nut from rotating with said screw so that rotation of said screw causes the nut to move in translation, the first monitoring means including a first end-of-stroke sensor for detecting that the actuator rod is arranged in the "landing gear refracted" position, and a second end-of-stroke sensor for detecting that the actuator rod is arranged in the "landing gear extended" position.

The anti-rotation means may be arranged between the nut and an actuator cylinder of the stationary means. In an alternative variant, the anti-rotation means may be arranged between a structure of the aircraft and the electric motor to prevent the actuator rod from rotating while allowing said rod to be moved in translation, for example.

The refraction actuator then makes it possible to satisfy requirements by allowing the landing gear leg to perform both an extension movement and a retraction movement in order to extend or retract the undercarriage out from or into the wheel bay.

It should be observed that the first monitoring means may comprise an external member which is external to the retraction actuator for verifying that the refraction actuator is in the "landing gear extended" position.

Furthermore, the first control means optionally includes a management member communicating with the first monitoring means and the electric motor of the retraction actuator, the management member communicating with the display means.

The management member may for example prevent extension or refraction of the undercarriage as a function of flight parameters. By way of example, if a pilot gives an order to retract the undercarriage while the aircraft is standing on the ground, then the management member may ignore the order and indicate an error.

The management member may also represent a member of the first control means and it may cause the undercarriage to be extended or retracted as a function of flight parameters.

Furthermore, it should be observed that the control means may include a control system operable by a person, the control system being connected to the management member.

In another aspect, the first control line may include at least one data concentrator and a bi-directional connection.

For example, in order to simplify the device, the management member may be connected to a front data concentrator communicating with a front undercarriage via a front controller area network (CAN) bus and with a rear data concentrator, the rear data concentrator communicating via a first rear CAN bus with a first rear undercarriage and via a second rear CAN bus with a second rear undercarriage.

The terms "front" and "rear" refer to the long direction of the aircraft, between a rear end and a front end that includes the nose of the aircraft.

In addition, the third control line may include a control unit interposed between the brake means and the third control means, the control unit transmitting a braking order to said brake means as a function of input orders coming from the third control means and from programmed braking logic.

The landing gear may have a first rear undercarriage and a second rear undercarriage, both fitted with respective braking means.

Each pilot then has one control member for controlling the third control means per rear undercarriage.

The control unit then applies pre-established braking logic as a function of orders coming from the various control members.

In addition, the control unit may include a self-test module for verifying operation of the brake means before a landing; the self-test module possibly being a segment of code programmed in a memory of the control unit and executable by a processor.

Furthermore, the landing gear may include fourth control means for controlling the braking means on the ground when the aircraft is stationary.

In addition to landing gear, the invention also provides an aircraft capable of landing vertically and fitted with such landing gear.

Furthermore, the invention also provides a method implemented with such landing gear, in which method, prior to landing, the following steps are performed:

verifying proper operation of the retraction actuator, with faulty operation being signaled to a pilot so that the pilot uses the second control means to extend the undercarriage by gravity; and when said landing gear includes brake means, verifying proper operation of the brake means, faulty operation being signaled to the pilot so that the pilot undertakes a vertical landing procedure that does not require use of the brake means.

BRIEF DESCRIPTION OF THE SEVERAL VIEWS OF THE DRAWINGS

The invention and its advantages appear in greater detail from the following description of embodiments given by way of illustration with reference to the accompanying figures, in which:

FIG. 2 is a section view of a retraction actuator incorporating blocking means; and FIG. 3 is a diagram showing the members that participate in braking a wheel of the undercarriage.

DETAILED DESCRIPTION OF THE INVENTION

Figure 1:
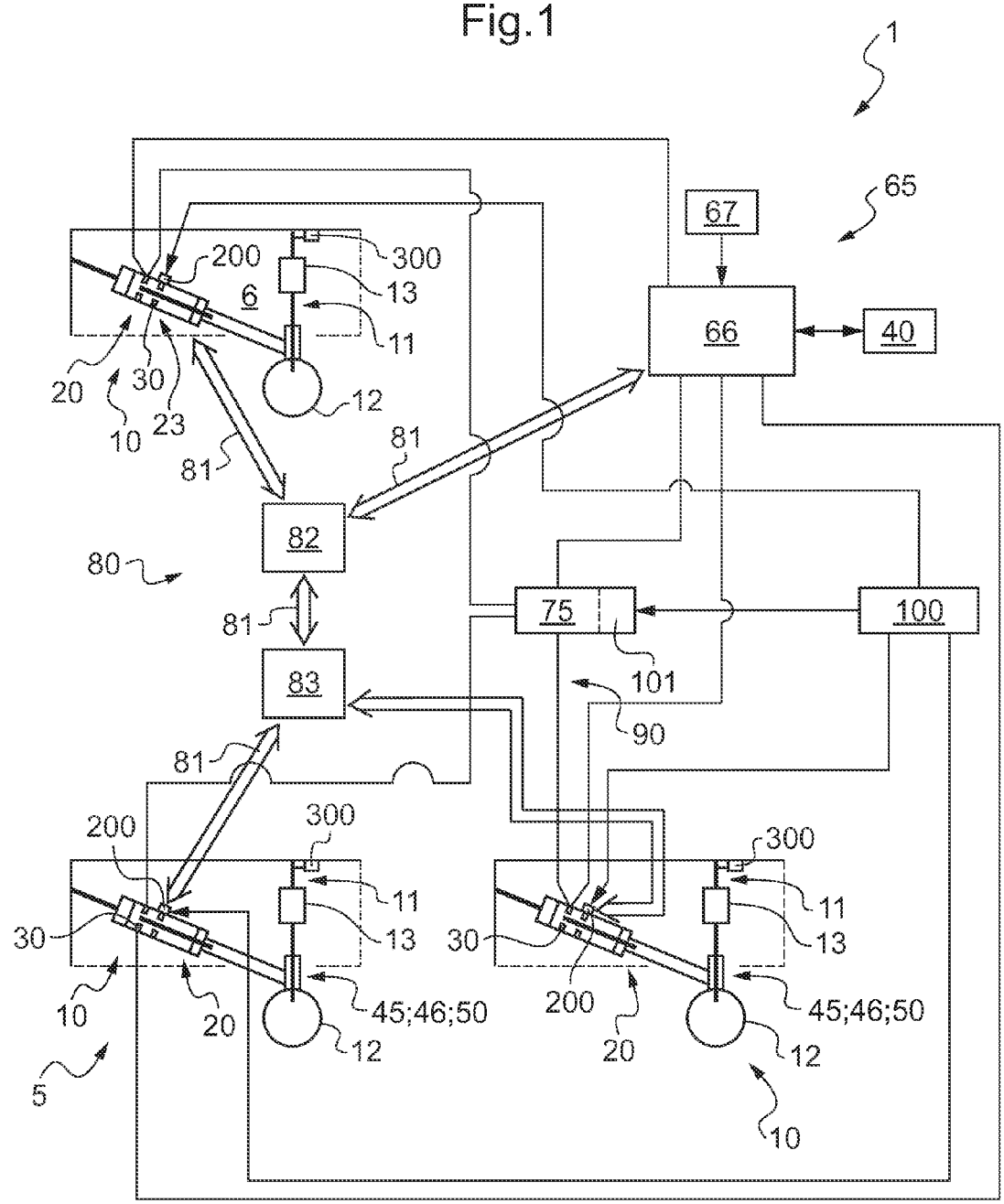
FIG. 1 is a diagram showing the members that participate in retracting and extending the undercarriage.

Elements that are present in more than one of the figures are given the same references in each of them.

FIG. 1 shows an aircraft 1 having landing gear 5. More particularly, the aircraft 1 is an aircraft suitable, in particular, for landing vertically.

The landing gear 5 comprises a plurality of retractable undercarriages 10, three undercarriages being shown in FIG. 1 in order to form a support polygon for the aircraft on the ground.

Each undercarriage 10 includes a landing gear leg 11 having a shock absorber 13 and at least one wheel 12. In addition, the undercarriage has a retraction actuator 20 connected to the leg 11 to enable the undercarriage to be retracted on request into a wheel bay and enabling the undercarriage to be extended on request at least in part from the bay 6.

The retraction actuator 20 is an electrical retraction actuator, and its length can be modified on request by an electric motor 23 and not by hydraulic means. Under such circumstances, the electric motor 23 can retract the retraction actuator 20 into a "landing gear retracted" position in order to cause the undercarriage to take up its position in the bay, and it can extend the retraction actuator 20 into a "landing gear extended" position in order to cause the undercarriage wheel to be extended out from the bay 6. To this end, the electric motor can move movable means of the refraction actuator relative to stationary means of the retraction actuator.

Furthermore, the landing gear includes one blocking means 30 per undercarriage both to block the retraction actuator in the "landing gear retracted" and "landing gear extended" positions, and also to enable the retraction actuator to be put into the "landing gear extended" position under gravity in an "emergency" situation.

The blocking means 30 comprise electrical means co-operating with the retraction actuator 20. For example, the blocking means 30 comprise a fail-safe brake arranged in the retraction actuator 20 to block movable means of the retraction actuator, such as an actuator rod.

Furthermore, the landing gear includes first monitoring means for verifying the operation of the retraction actuator.

FIG. 2 is a section view of a retraction actuator 20 in a preferred embodiment.

The retraction actuator 20 has an actuator cylinder 22 including fastener means 22' for fastening to a wall of a wheel bay. Under such circumstances, the actuator cylinder constitutes stationary means of the retraction actuator 20.

Conversely, the retraction actuator has movable means, specifically an actuator rod 21 having a first end that is suitable for sliding inside the actuator cylinder 22 and a second end that is suitable for being fastened to a landing gear leg 11.

In order to enable the movable means to move relative to the stationary means, the retraction actuator includes an electric motor 23.

The electric motor 23 comprises a stator 23' secured to the actuator cylinder and a rotor 23" secured to a screw 24 via a fastener device 28. The fastener device may include a pair of ball bearings or a pair of sloping contact bearings.

Under such circumstances, the actuator rod 21 has a nut 25 with the screw 24 passing therethrough. Such a nut may be a nut with satellite rollers.

The landing gear includes anti-rotation means 26 for preventing the nut 25 rotating with the screw 24 so that rotation of the screw 24 causes the nut 25 to move in translation.

The anti-rotation means 26 may then be arranged between the nut 25 and the actuator cylinder 21. Nevertheless, other variants are possible.

The refraction actuator may also include two end-of-stroke dampers 27.

Furthermore, the first monitoring means 35 include a first end-of-stroke sensor 36 for detecting the movable means being positioned in the "landing gear retracted" position, and a second end-of-stroke sensor 37 for detecting the movable means being positioned in the "landing gear extended" position.

In another aspect, the blocking means 30 are advantageously inserted in the actuator cylinder 22.

The blocking means 30 comprise a fail-safe brake 31 suitable for blocking the rotor 23" and thus the actuator rod when it is not electrically powered.

Thus, when there is no electrical power, the brake 31 blocks the rotor 23" and thus blocks the position of the movable means relative to the stationary means of the retraction actuator, i.e. the position of the actuator rod 21 relative to the actuator cylinder 22.

Advantageously, the brake 31 has two coils, each capable of unblocking the retraction actuator. A first coil enables the retraction actuator to be retracted or extended under drive from the motor 23 in a normal mode, while a second coil allows the actuator to be extended by gravity in an emergency mode.

With reference to FIG. 1, the landing gear includes first control means 65 for controlling the motor 23 of each retraction actuator, these motors being powered electrically by electricity generator means 100 of the aircraft.

The first control means then transmit an order to each motor.

This order may be transmitted by a single first control line to each motor. The term "transmitted by a single first control line to each motor" is used to mean that there is no need to provide redundancy in the communications means between the first control means and its motor.

Thus, the first control means may comprise a management member 66 communicating with the first monitoring means 35 and with the electric motor of the retraction actuator of each undercarriage, the management member 66 communicating with display means 40. Such a management member may be a unit provided with at least one processor and with memory, for example.

Furthermore, the first control means 65 may include a control system 67 operable by a pilot, the control system 67 being connected to the management member 66.

The first control line 80 may then comprise at least one data concentrator associated with bi-directional wired connections.

In the preferred embodiment shown, the management member 66 communicates over a CAN type bus with a front data concentrator 82, this front data concentrator communicating with the power electronics 200 of a front undercarriage via a CAN bus.

Furthermore, the front data concentrator 82 communicates with a rear data concentrator 83, the rear data concentrator 83 communicating with the power electronics 200 of a first rear undercarriage via a CAN bus and with the power electronics 200 of a second rear undercarriage via another CAN bus.

Furthermore, the landing gear 5 includes second control means 75 for controlling each of the blocking means 30.

The second control means may comprise a single control line made up of two wires per blocking means, a first wire being connected directly to a respective blocking means while a second wire is connected directly to the blocking means via the management member 66.

The second control means 75 may include an emergency battery 101 for powering the blocking means, if necessary.

In flight, each undercarriage is retracted into its well 6. The first end-of-stroke sensor in each refraction actuator informs the management member that the movable means are in the "landing gear refracted" position, the management member reproducing this information on the display means 40.

Likewise, undercarriage locked information related to the state of the blocking means is displayed on the display means 40.

In order to verify this information, the management member may activate the electric motors in each of the retraction actuators. If the movable means remain in position, and thus if the information coming from the first end-of-stroke sensors remains unchanged, then the management member can deduce that the blocking means are operating correctly.

Furthermore, if extension of the undercarriage is requested, e.g. via the control system 67, the management member can verify that the order is pertinent, possibly by using information coming from auxiliary members of the aircraft.

By way of example, the management member may ignore an order to extend the landing gear if the aircraft is flying at a forward speed greater than a threshold, while also informing the pilot of this inconsistency by using the display means 40.

If the order is not judged to be inconsistent, then the management member 66 transmits the extension order to each undercarriage. When the power electronics 200 of each retraction actuator receives the order to move the undercarriage, the power electronics 200 of each retraction actuator powers the first coil of the associated fail-safe brake 31 in order to unblock the retraction actuator.

Under such circumstances, the power electronics of each retraction actuator delivers electrical power to the associated motor 23 in order to cause its rotor 23" to rotate, the rotor 23" driving rotation of the screw 24 of the retraction actuator. This results in the movable means of the refraction actuator moving in translation.

When the movable means have reached the second end-of-stroke sensor, this second end-of-stroke sensor informs the power electronics 200, which stops the motor 23 and ceases delivering power to the first coil. The retraction actuator is blocked once more.

It can be understood that the retraction actuator is a two-position actuator, i.e. it has a "landing gear extended" position and a "landing gear retracted" position.

This information may be confirmed by an external member 300, such as a sensor having a pusher co-operating with the landing gear leg in the "landing gear extended" position.

In the method implemented, if the undercarriage is not extended, i.e. if the external member 300 is not actuated, for example, an operating fault is transmitted to the pilot, with the management member making use of the display means 40 for this purpose.

It should be observed that the term "display means" designates either a single display means or else a set of distinct display means.

The pilot can then actuate the second control means 75. In the embodiment described, the second control means 75 act on the management member 66. The management member can inhibit the emergency deployment order if it is inconsistent, e.g. if the management member determines that the aircraft is on the ground. For this purpose, the management member is connected in series in the second control line 90 connecting the second control means to each of the blocking means.

In an emergency mode, the second control means power the second coil of the brake 31 of each undercarriage in order to unblock each of the retraction actuators. The weight of each undercarriage and in particular of the assembly comprising the landing gear leg and the wheel generate a traction force on each movable means. Each movable means then moves in translation under the effect of gravity alone.

Once an undercarriage has been extended, the second coil ceases to be powered electrically, thereby blocking the retraction actuator in the "landing gear extended" position.

For example, the management member 66 ceases to deliver electrical power to the blocking means on receiving a signal from the external members 300, the management member operating as a switch capable of opening or closing an electric circuit, depending on the situation.

In addition, at least two undercarriages of the landing gear have respective brake means 45 in order to brake at least one wheel of the undercarriage.

For example, first and second rear undercarriages located on either side of an anteroposterior plane of symmetry may have respective brake means.

Under such circumstances, it is possible to control movements of the aircraft on the ground with the help of the brakes. By braking the wheels of only one of the rear undercarriages, it is possible to cause the aircraft to turn.

Each brake means 45 may include an electric actuator 46 for moving a brake pad relative to a brake disk constrained to rotate with the wheels of the undercarriage.

Furthermore, each undercarriage may have second monitoring means 50 for monitoring the operation of the brake means.

Furthermore, each brake means may include a blocking member for blocking the electric actuator of each brake means so as to maintain braking pressure, e.g. a fail-safe member.

With reference to FIG. 3, third control means 70 serve to control the braking that is exerted.

For example, the first control means comprise one control member 71 per pilot and per brake means, i.e. four control members 71 when there is a pilot and a copilot in the embodiment shown.

A third control line 85 then connects each control member to the brake means, the third control line including a control unit 88.

By way of example, each control member is connected to a data concentrator 82 by a CAN bus, the data concentrator 82 being connected to the control unit 88 by another CAN bus. The control unit 88 is then connected to each brake means, in particular to each actuator 45, and to the second monitoring means 50 for monitoring the brake means.

In addition, the control unit is electrically powered by an electricity generator 100.

The control unit may also communicate with management means, such as the management member 66 that is sometimes referred to as the "aircraft management computer".

The control unit may include at least one processor and memory, the rotor controlling the brake means as a function of logic preprogrammed in the memory.

The control unit may also include a self-test module 89 suitable for testing the brake means before landing, the self-test module possibly being a segment of code in software, for example.

Finally, the braking system includes fourth control means 90 powered by electricity generator means 100 and suitable for communicating with the control unit.

For example, the fourth control means 90 act while on the ground to transmit electrical power to the control unit 88 in order to request maximum braking of the wheels. Such fourth control means 90 are sometimes referred to as a "parking brake".

Consequently, prior to landing, the self-test module 89 verifies that the brake means are operative.

For example, the module 89 requests the actuator 45 to move by a calibrated amount in order to cause the brake pad to apply a predetermined pressure against the brake disk. If the second monitoring means does not detect the appropriate pressure, then the control unit 88 informs the management member 66, which in turn informs the pilot via the display member 60.

The pilot then begins a vertical landing procedure in order to avoid making use of potentially faulty brake means.

It is possible to envisage other known monitoring methods.

Furthermore, when the third control means 70 issue a braking order, the braking order is transmitted to the control unit 88.

The order may optionally be transmitted to the management member 66 for verification. Thus the management member 66 may inhibit the braking order if the braking order is found to be inappropriate. For example, the management member may inhibit or modify a braking order that is asymmetrical and violent that might cause the aircraft to lurch sideways while it is moving at a relatively high speed on the ground.

Assuming that a valid braking order is transmitted to the control unit 88, the control unit 88 causes the electric actuators 45 to operate in application of the preprogrammed logic.

On the ground and possibly with the aircraft stationary, it is also possible to brake the wheels using the fourth control means 90.

If a person operates the fourth control means 90, the fourth control means 90 order the control unit 88 to exert maximum braking, or to block the brake means in a position that generates maximum braking.

Naturally, the present invention may be subjected to numerous variations as to its implementation. Although several embodiments are described above, it will readily be understood that it is not conceivable to identify exhaustively all possible embodiments. It is naturally possible to envisage replacing any of the means described by equivalent means without going beyond the ambit of the present invention.

What is claimed is:

1. A landing gear for an aircraft capable of landing vertically, the landing gear comprising at least one undercarriage, the undercarriage comprising a landing gear leg carrying at least one wheel, wherein the undercarriage comprises:
    a refraction actuator connected to the landing gear leg and provided with an electric motor to extend and retract an extendable actuator rod of the retraction actuator relative to a cylinder of the retraction actuator between a landing gear retracted position and a landing gear extended position, for the purposes of extending the wheel from a wheel bay and for retracting the wheel into the wheel bay;
    a fail-safe brake connected to the actuator rod for preventing movement of the actuator rod relative to the cylinder during a normal mode in the absence of electricity applied to the fail-safe brake, the fail-safe brake thereby locks the actuator rod in at least one of the refracted position and extended position, and the fail-safe brake operates to allow the rod to be positioned in the extended position by gravity during an emergency mode;
    a first sensor for monitoring the operation of the retraction actuator, the first sensor being connected to a display for indicating the position of the retraction actuator and for indicating one of the normal mode or emergency mode of the fail-safe brake; and
    a first controller for controlling the retraction actuator, and a second controller for controlling the fail-safe brake.

2. The landing gear according to claim 1, wherein the fail-safe brake comprises two electrical coils, wherein a first coil prevents movement of the extendable actuator rod in the absence of electricity in the normal mode and a second coil allows the actuator to be extended in the emergency mode.

3. The landing gear according to claim 1, wherein the electric motor includes a stator and a rotor, the rotor being secured to a screw and co-operating with the fail-safe brake, the extendable actuator rod provided with a nut arranged on the screw, the landing gear including anti-rotation means for preventing the nut from rotating with the screw so that rotation of the screw causes the nut to move in translation, the first sensor monitoring a first end-of-stroke of the actuator rod to ensure that the actuator rod is arranged in the retracted such that the retraction actuator is in the landing gear retracted position, and a second sensor monitoring the second end-of-stroke of the actuator rod to ensure that that the actuator rod is extended such that the refraction actuator is in the landing gear extended position.

4. The landing gear according to claim 1, wherein the first sensor is external to the retraction actuator for verifying that the retraction actuator is in the landing gear extended position.

5. The landing gear according to claim 1, wherein the undercarriage comprises:
    single brake means including an electric actuator for braking each wheel;
    second sensor for detecting malfunction of the brake means, the second sensor connected to a display member for signaling a malfunction of the brake means; and
    a third controller for controlling the brake means.

6. The landing gear according to claim 5, including fourth controller for controlling the brake means on the ground so as to cause the brake means to exert maximum braking.

7. The landing gear according to claim 5, wherein a third control line includes a control unit interposed between the brake means and the third controller, the control unit transmitting a braking order to the brake means as a function of input orders coming from the third controller and from programmed braking logic.

8. The landing gear according to claim 7, where the control unit includes a self-test module for verifying operation of the brake means before a landing.

9. The landing gear according to claim 1, wherein the first controller is connected to the retraction actuator by a single first control line, and/or the second controller is connected to the fail-safe brake by a single second control line, and/or a third controller is connected to a brake means by a single third control line.

10. The landing gear according to claim 9, wherein the first control line includes at least one data concentrator and a bi-directional connection.

11. The landing gear according to claim 1, wherein first the controller communicates with the first sensor and the electric motor of the retraction actuator and the display.

12. The landing gear according to claim 11, wherein the first controller includes a control system operable by a person.

13. An aircraft capable of landing vertically, the aircraft comprising:
   landing gear having least one retractable undercarriage leg carrying at least one wheel;
   a retraction actuator including an extendable actuator rod for movement relative to a cylinder between a first and second actuator rod position, wherein the actuator rod is connected to the undercarriage leg for moving the undercarriage leg between a landing gear refracted position and a landing gear extended position respectively, wherein in the landing gear refracted position the wheel is retracted into an aircraft bay, and in the extend position, the wheel is extended from the aircraft bay;
   an electric motor connected to the actuator rod to extend and retract the actuator rod between the first and second actuator rod positions;
   a fail-safe brake connected to the actuator rod for preventing movement of the actuator rod relative to the cylinder during a normal mode in the absence of electricity applied to the fail-safe brake, the fail-safe brake thereby locks the actuator rod in at least one of the refracted position and extended position, and the fail-safe brake operates to allow the extendable rod to be positioned in the extended position by gravity during an emergency mode;
   a first sensor for monitoring the operation of the retraction actuator,
   a display in communication with the first sensor and the fail-safe brake and adapted for indicating the position of the actuator rod and for indicating one of the normal mode or emergency mode of the fail-safe brake;
   a first controller for controlling the retraction actuator, and
   a second controller for controlling the fail-safe brake,
   wherein if the display indicates to an operator of the aircraft that the fail-safe brake is in the emergency mode and the undercarriage leg is in the landing gear retracted position, the second controller is operable by the operator to extend the undercarriage leg by gravity to the landing gear extended position.

14. The aircraft according to claim 13, wherein the undercarriage comprises:
   single brake means including an electric actuator for braking each wheel;
   second sensor for detecting malfunction of the brake means, the second sensor connected to the display for signaling a malfunction of the brake means; and
   a third controller for controlling the brake means,
   wherein if the display indicates the malfunction of the brake means, the operated in directed to undertake a vertical landing procedure that does not require use of the brake means.

15. The aircraft according to claim 13, wherein the fail-safe brake comprises two electrical coils, wherein a first coil prevents movement of the extendable actuator rod in the absence of electricity in the normal mode and a second coil allows the actuator to be extended in the emergency mode.

16. The aircraft according to claim 13, wherein the electric motor includes a stator and a rotor, the rotor being secured to a screw and co-operating with the fail-safe brake, the extendable actuator rod provided with a nut arranged on the screw, the landing gear including anti-rotation means for preventing the nut from rotating with the screw so that rotation of the screw causes the nut to move in translation, the first sensor monitoring a first end-of-stroke of the actuator rod to ensure that the actuator rod is arranged in the retracted such that the retraction actuator is in the landing gear retracted position, and a second sensor monitoring the second end-of-stroke of the actuator rod to ensure that that the actuator rod is extended such that the retraction actuator is in the landing gear extended position.

17. A landing gear for an aircraft capable of landing vertically, the landing gear having at least one undercarriage leg carrying at least one wheel, wherein the landing gear comprises:
   a refraction actuator for moving the undercarriage leg between a landing gear refracted position and a landing gear extended position, wherein in the landing gear retracted position the wheel is retracted into an aircraft bay, and in the extend position, the wheel is extended from the aircraft bay, the retraction actuator including:
      a cylinder;
      an extendable actuator rod for movement relative to the cylinder between first and second actuator rod positions corresponding to the landing gear retracted position and the landing gear extended position respectively;
      a nut arranged on a screw extending from the actuator rod; and
      an anti-rotation device for preventing the nut from rotating with the screw so that rotation of the screw causes the nut to move in translation;
   an electric motor connected the screw to extend and retract the actuator rod between the first and second actuator rod positions;
   a fail-safe brake connected to the actuator rod for preventing movement of the actuator rod relative to the cylinder during a normal mode in the absence of electricity applied to the fail-safe brake, the fail-safe brake thereby locks the actuator rod in at least one of the retracted position and extended position, and the fail-safe brake operates to allow the extendable rod to be positioned in the extended position by gravity during an emergency mode;
   a first sensor for monitoring the first end-of-stroke of the actuator rod to ensure that the actuator rod is arranged in the retracted position and thereby that the undercarriage leg is in the landing gear retracted position;
   a second sensor monitoring the second end-of-stroke of the actuator rod to ensure that that the actuator rod is the extended position and thereby that the undercarriage leg is in the landing gear extended position;
   a first controller for controlling the retraction actuator, and
   a second controller for controlling the fail-safe brake,
   wherein the electric motor includes a stator and a rotor, the rotor being secured to a screw and co-operating with the fail-safe brake.

18. The landing gear according to claim 17, further comprising a display in communication with the first sensor and the fail-safe brake and adapted for indicating the position of the actuator rod and for indicating one of the normal mode or emergency mode of the fail-safe brake,
   wherein if the display indicates to an operator of the aircraft that the fail-safe brake is in the emergency mode and the undercarriage leg is in the landing gear refracted position, the second controller is operable by the operator to extend the undercarriage leg by gravity to the landing gear extended position.

19. The landing gear according to claim 17, wherein the fail-safe brake comprises two electrical coils, wherein a first coil prevents movement of the extendable actuator rod in the absence of electricity in the normal mode and a second coil allows the actuator to be extended in the emergency mode.

\* \* \* \* \*